(12) United States Patent
Akkerman et al.

(10) Patent No.: US 7,456,635 B2
(45) Date of Patent: Nov. 25, 2008

(54) CIRCUIT ARRANGEMENT COMPRISING A MULTI-WIRE LINE FOR SUPPLYING CURRENT AND EMITTING SIGNALS

(75) Inventors: Petrus Akkerman, Berlin (DE); Andreas Lemke, Berlin (DE); Ingmar Bönig, Berlin (DE)

(73) Assignee: MAS Auer GmbH (DE)

( * ) Notice: Subject to any disclaimer, the term of this patent is extended or adjusted under 35 U.S.C. 154(b) by 0 days.

(21) Appl. No.: 10/566,690

(22) PCT Filed: Jul. 20, 2004

(86) PCT No.: PCT/DE2004/001651

§ 371 (c)(1),
(2), (4) Date: Dec. 22, 2006

(87) PCT Pub. No.: WO2005/013229

PCT Pub. Date: Feb. 10, 2005

(65) Prior Publication Data

US 2007/0139051 A1  Jun. 21, 2007

(30) Foreign Application Priority Data

Aug. 1, 2003  (DE) .................................. 103 36 055

(51) Int. Cl.
*G01R 31/14* (2006.01)
*G01R 31/02* (2006.01)

(52) U.S. Cl. .................. 324/509; 324/510; 324/511; 324/537

(58) Field of Classification Search .......... 324/509–511, 324/537, 538

See application file for complete search history.

(56) References Cited

U.S. PATENT DOCUMENTS 5,294,890 A * 3/1994 Hemminger et al. ......... 324/549
7,265,955 B2 * 9/2007 Fink ............................ 361/42

FOREIGN PATENT DOCUMENTS

DE         28 09596        9/1979

* cited by examiner

*Primary Examiner*—Timothy J Dole
(74) *Attorney, Agent, or Firm*—Wood, Phillips, Katz, Clark & Mortimer

(57) ABSTRACT

A circuit arrangement with a multi-wire line for supplying current to a sensor and for emitting a signal that corresponds to a measured value to an evaluation module via a signal line. To eliminate measuring errors caused by short circuits, first and second resistors, with the second resistor provided with a current tap, and a transistor, which is connected to a clock-pulse generator that bridges the first resistor in a clocked manner, are connected in series to the signal emission line. A comparator for comparing the values obtained via the resistors in the successive switching positions of the transistor and for emitting a short-circuit error message to the evaluation module, if the measured values differ in the successive clock pulses, is connected downstream of the resistors.

10 Claims, 1 Drawing Sheet

CIRCUIT ARRANGEMENT COMPRISING A MULTI-WIRE LINE FOR SUPPLYING CURRENT AND EMITTING SIGNALS

BACKGROUND OF THE INVENTION

Field of the Invention

The invention relates to a circuit arrangement comprising a multi-wire line for supplying current to a sensor and for emitting a signal that corresponds to a measured value to an evaluation module via a signal line.

It is known that sensors and measuring heads for physical quantities are operated via a multi-wire line. Two lines are used for supplying voltage and another line is used for emitting the measured value. The physical quantity to be measured is converted in the sensor or measuring head into an electrical signal such as a current. This measured value is emitted via a signal line and further processed in an evaluation module.

A known arrangement with a multi-wire line for supply and emission of measured values consists of a measuring head or sensor that is connected to a supply and processing module via a three-wire line. Two power lines provide the supply voltage to the sensor while another line delivers the measured quantity from the sensor to the processing unit. A measured quantity may, for example, be a current that is generated by a power source in proportion to (corresponding to) the physical quantity to be measured. For example, the physical quantity can be a gas concentration that the sensor converts into a current with different amperages depending on the gas concentration. This current is conducted via the second line to the evaluation module, and that module triggers an alarm based on thresholds when said current exceeds a certain current value. All three sensor terminals have specific potentials with respect to ground due to line resistance. The circuit arrangements used in conjunction with measuring heads have the disadvantage that, in the event of a short circuit between the terminal lines, the potential difference between these terminals results in a short-circuit current that flows to the evaluation module. If this short-circuit current is within the range of the measuring signal, the result will be faulty because the evaluation module cannot distinguish between a short-circuit current and a measuring current.

SUMMARY OF THE INVENTION

It is the object of this invention to design a circuit arrangement of the type described at the outset in such a way that measuring errors occurring as a result of a short circuit are prevented.

A circuit arrangement between the sensor and the evaluation module is used that can distinguish if the current signal present on an output signal line is a measured value or a faulty signal generated by a short circuit. In the arrangement according to the invention, clocked operation of a transistor changes the load at the sensor output. A load change does not influence a measuring signal generated by a power source in the sensor as the power source operates load-independently. If a short circuit occurs, however, the current is not generated by a power source and the current in the signal line changes when the load changes. The signals at different loads are temporarily stored in buffer condensers and compared using a comparator. If the signals in two subsequent clock pulses are the same, they represent a measured value, if they differ, they represent short-circuit current signals. The benefit of the circuit arrangement according to the invention is that it can distinguish if a signal on the signal line originates from a physical event at the sensor or is caused by a short circuit in the sensor.

BRIEF DESCRIPTION OF THE DRAWING

An embodiment of the invention is explained in greater detail with reference to the only FIGURE which shows a circuit arrangement that can detect faults caused by short circuits for a sensor with an associated evaluation module.

DETAILED DESCRIPTION OF THE DRAWING

Figure 1:
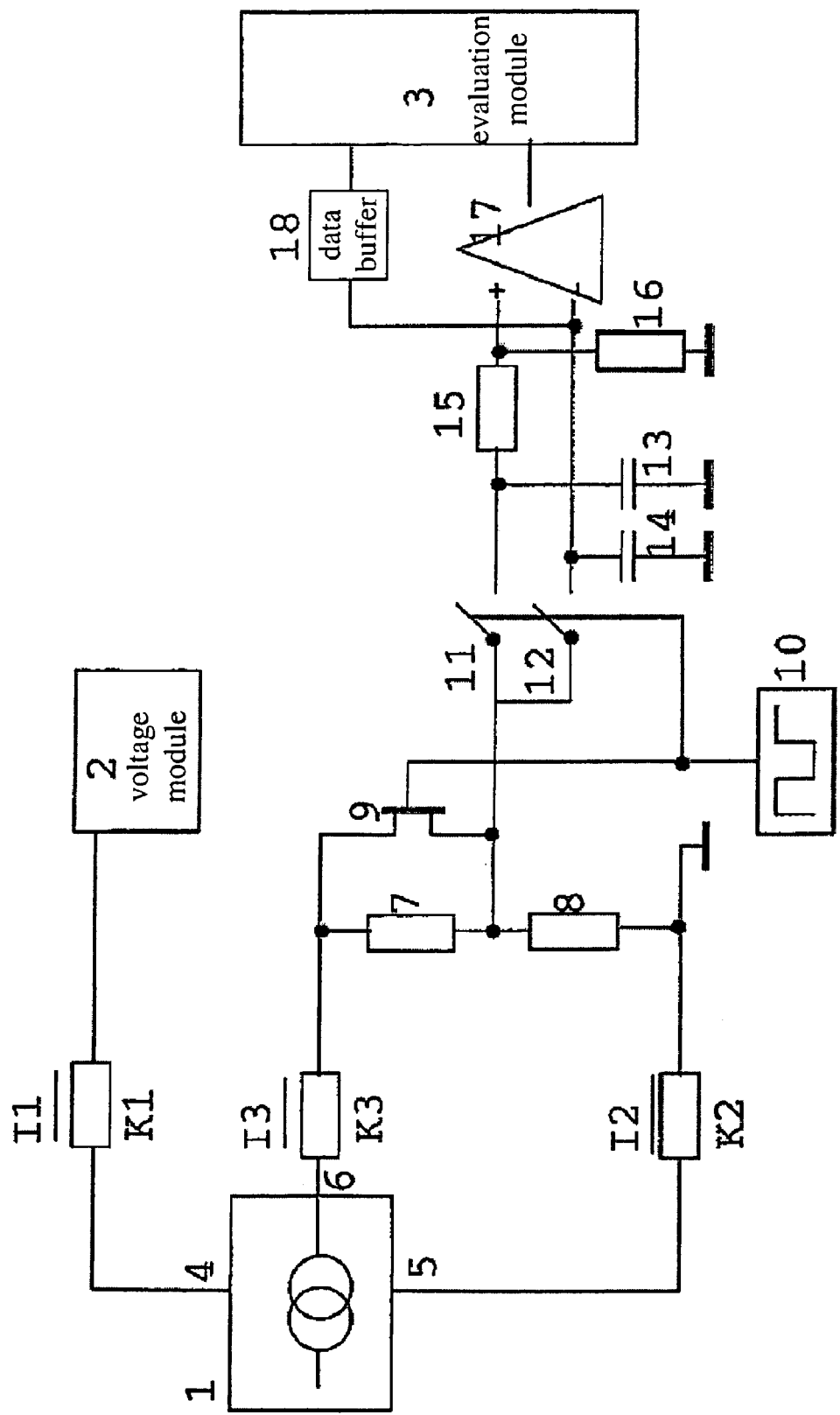

A sensor 1 is connected via a three-wire cabling that comprises line resistors K1, K2, and K3, and through which flow supply currents I1, I2, or the measuring current (output signal) I3, respectively, to a voltage source 2 for supplying the sensor with a fixed voltage and to an evaluation module 3 for evaluating the output signals provided by the sensor. The sensor 1 is supplied with a fixed voltage using terminals 4 and 5 via which a line current I1 or I2, respectively, is conducted. A current output signal I3 generated by a circuit in sensor 1 in proportion to the physical quantity measured is emitted and eventually forwarded to the evaluation module 3 via the signal output terminal 6. A short circuit that occurs between terminals 5 and 6 or a measuring error caused by it could not be detected as yet. According to the embodiment, the circuit arrangement for detecting a measuring error caused by a short circuit includes a first resistor 7 and a second resistor 8 connected in series to the former where a voltage that corresponds to the output signal I3 of sensor 1 is tapped off. The state where the resulting current from terminals 5 and 6 that have a specific potential is divided over the line resistor K3 and the series connection of line resistor K2 and the first and second resistors 7 and 8 connected in parallel is not detected as a fault because the measuring current (output signal) is within the regular current range. The further design of the circuit arrangement for preventing measuring errors caused by a short circuit utilizes the fact that the measuring current I3 is not provided by a power source in this case. A transistor 9 is therefore provided in parallel to the resistor 7, the transistor 9 being alternately switched in clocked pulses t1 and t2 (conducting and blocked) by a clock pulse generator 10. Furthermore, a first or second electronic switch 11 and 12, respectively, are included in the circuit arrangement that are alternately closed in sync with the pulse provided by the clock pulse generator 10. The first switch 11 conducts when the transistor 9 is conducting, and the second switch 12 conducts when the transistor 9 is blocked. Downstream from the switches 11 and 12 are a first buffer condenser 13 and a second buffer condenser 14, respectively, to store the voltage tapped off the second resistor 8 and thus the output signals I3 of the sensor 1 sent via the first or second switch 11, 12, respectively, when the first or second switch 11, 12, respectively, is closed. Other components included in the circuit arrangement upstream of the evaluation module 3 are voltage-dividing resistors 15 and 16 and a subsequent comparator 17 for comparing the voltage values of output signals I3 stored in the first or second buffer condenser 13, 14, respectively, and a data buffer 18.

The operation of the circuit arrangement described with reference to the FIGURE with the circuit arrangement being able to distinguish between a current output signal I3 as the measuring result of sensor 1 and a fault caused by a short circuit, and with the circuit arrangement eliminating faults, is described below:

The clock pulse generator 10 switches the transistor 9 to conducting in a first clock pulse t1 so that the first resistor 7 is bridged and the measuring current/current output signal I3 only causes a voltage drop at the second resistor 8. During this first clock pulse t1, the switch 12 is open and the switch 11 is closed so that the measured value generated is temporarily stored in the first buffer condenser 13. During the second clock pulse t2, the clock pulse generator switches the transistor 9 to blocking. In this case, the measuring current/current output signal I3 generates a voltage drop at the first and second resistors 7 and 8. During this clock pulse t2, with switch 11 being open and switch 12 being closed, the respective measured value is stored in the second buffer condenser 14. The stored values of buffer condensers 13, 14 are compared in the comparator 17 for fault detection via the voltage-dividing resistors 15, 16.

If the measuring current originates from the power source of the sensor 1 and was not produced by a short circuit, the voltage drop at the second resistor 8 and thus the values stored in the buffer condensers 13, 14 are equal, regardless of whether the current was conducted via the transistor 9 switched to conducting or via the resistor 7 because the power source is load-independent.

The voltage-dividing resistors 15, 16 conduct the first intermediate value from the first buffer condenser 13 to the positive input (+) of comparator 17 while the second intermediate value from the second buffer condenser 14 is conducted directly to the negative input (−) of comparator 17. Due to the voltage-dividing resistors 15 and 16, the positive input value at the comparator 17 is smaller than the negative input value so that the comparator 17 does not deliver an error signal and the value from buffer condenser 14 can be output as fault-free measured value/output current signal I3 of the sensor 1 via the data buffer 18 to the evaluation module 3.

However if the current output signal I3 originates from a short circuit between the wires or terminals 4, 5 and 6 of the sensor, the voltage drop measured at the second resistor 8 becomes load-dependent because the short-circuit current does not originate from a power source but results from a difference in potential between terminals 5 and 6 of sensor 1. During clock pulse t1 (transistor 9 conducting, first resistor 7 bridged), the entire voltage drops at the second resistor 8 and is temporarily stored in the first buffer condenser 13. During clock pulse t2 (transistor 9 blocking, voltage drop at the first resistor 7) the voltage is divided between the first and second resistors 7 and 8, and the voltage drop in the second resistor 8 is temporarily stored in buffer condenser 14. As the value stored in the second buffer condenser 14 is smaller than the value stored in the first buffer condenser 13, a greater value is applied to the positive comparator input than to its negative input. Thus the comparator 17 returns a signal that is different from zero and corresponds to an error message. The measured value stored in the data buffer 18 is identified as faulty and is not processed in the evaluation module, in this case.

List of Reference Symbols
1 Sensor
2 Voltage module
3 Evaluation module
4 Terminal
5 Terminal
6 Signal output terminal
7 First resistor
8 Second resistor
9 Transistor
10 Clock pulse generator
11 First electronic switch
12 Second electronic switch
13 First buffer condenser
14 Second buffer condenser
15 Voltage-dividing resistor
16 Voltage-dividing resistor
17 Comparator
18 Data buffer
K1, K2, K3 Line resistors
I3 Output signal/measuring current of 1
t1, t2 Clock pulses of 10

The invention claimed is:

1. A circuit arrangement comprising a multi-wire line for supplying current to, and for emitting electric signals from a sensor, the electric signals corresponding to measured values to an evaluation module via a signal line, characterized in that, for eliminating measuring errors caused by short circuits, first and second resistors with voltage tap-off at the second resistor and a transistor connected to a clock-pulse generator and bridging the first resistor in a clocked manner are connected in series to the signal line, and in that a comparator is provided downstream from the resistors to compare the values received via the second resistor in subsequent switching positions of the transistor and for issuing a short-circuit error message to the evaluation module if measured values in subsequent clock pulses differ.

2. The circuit arrangement according to claim 1, characterized in that first and second electronic switches are provided downstream from the resistors that, in sync with the pulses from the clock pulse generator, alternately provide a conducting connection to a first or second storage module, respectively, for temporary storage of the measured values tapped off the second resistor in the respective clock pulse with the transistor closed or open.

3. The circuit arrangement according to claim 2, characterized in that a voltage divider with voltage-dividing resistors is provided upstream of the comparator.

4. The circuit arrangement according to claim 3, characterized in that a data buffer for temporary storage of the measuring signal emitted by the sensor and for feeding it to the evaluation module if the measurement was free of short circuits is provided upstream of the comparator.

5. The circuit arrangement according to claim 2, characterized in that the first or second storage module is a buffer condenser.

6. The circuit arrangement according to claim 5, characterized in that a data buffer for temporary storage of the measuring signal emitted by the sensor and for feeding it to the evaluation module if the measurement was free of short circuits is provided upstream of the comparator.

7. The circuit arrangement according to claim 2, characterized in that a data buffer for temporary storage of the measuring signal emitted by the sensor and for feeding it to the evaluation module if the measurement was free of short circuits is provided upstream of the comparator.

8. The circuit arrangement according to claim 1, characterized in that a voltage divider with voltage-dividing resistors is provided upstream of the comparator.

9. The circuit arrangement according to claim 8, characterized in that a data buffer for temporary storage of the measuring signal emitted by the sensor and for feeding it to the evaluation module if the measurement was free of short circuits is provided upstream of the comparator.

10. The circuit arrangement according to claim 1, characterized in that a data buffer for temporary storage of the measuring signal emitted by the sensor and for feeding it to the evaluation module if the measurement was free of short circuits is provided upstream of the comparator.

* * * * *

UNITED STATES PATENT AND TRADEMARK OFFICE
CERTIFICATE OF CORRECTION

PATENT NO. : 7,456,635 B2
APPLICATION NO. : 10/566690
DATED : November 25, 2008
INVENTOR(S) : Akkerman et al.

It is certified that error appears in the above-identified patent and that said Letters Patent is hereby corrected as shown below:

Title page, item (73)    Assignee: should read as follows:
MSA Auer GmbH  (DE)

Signed and Sealed this

Third Day of February, 2009

JOHN DOLL
*Acting Director of the United States Patent and Trademark Office*